E. H. LORENZ.
TYPE WRITING MACHINE.
APPLICATION FILED JUNE 5, 1908.
1,082,535.
Patented Dec. 30, 1913.
3 SHEETS—SHEET 2.
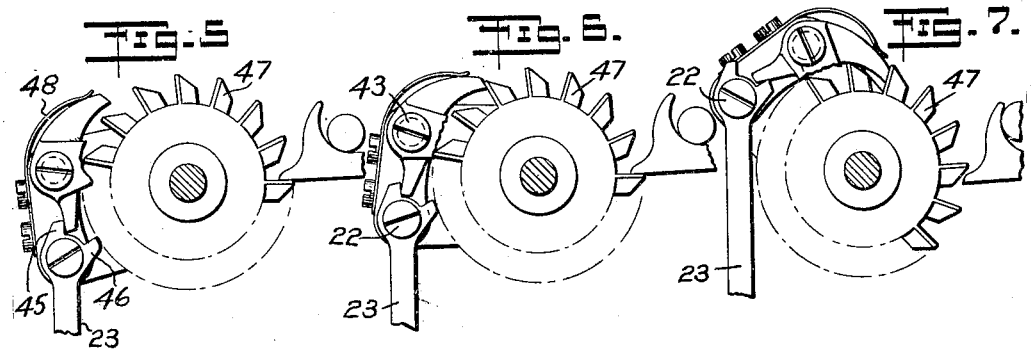
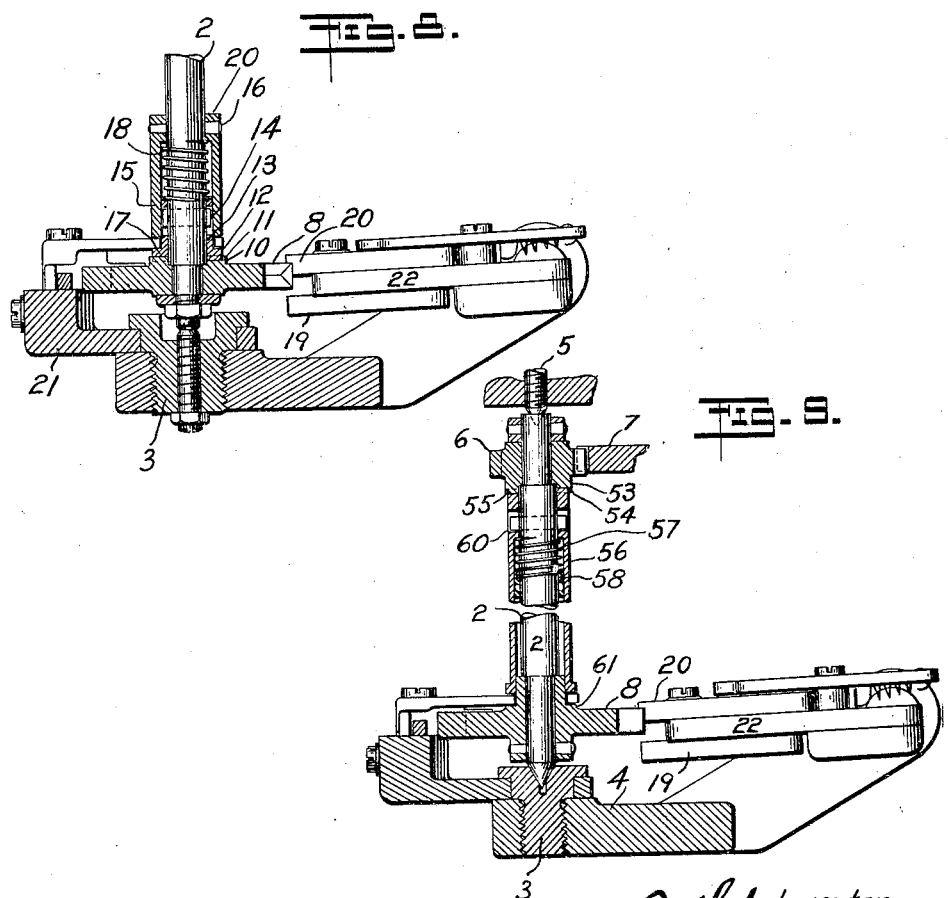
Witnesses
Inventor
E. H. Lorenz
By his Attorneys

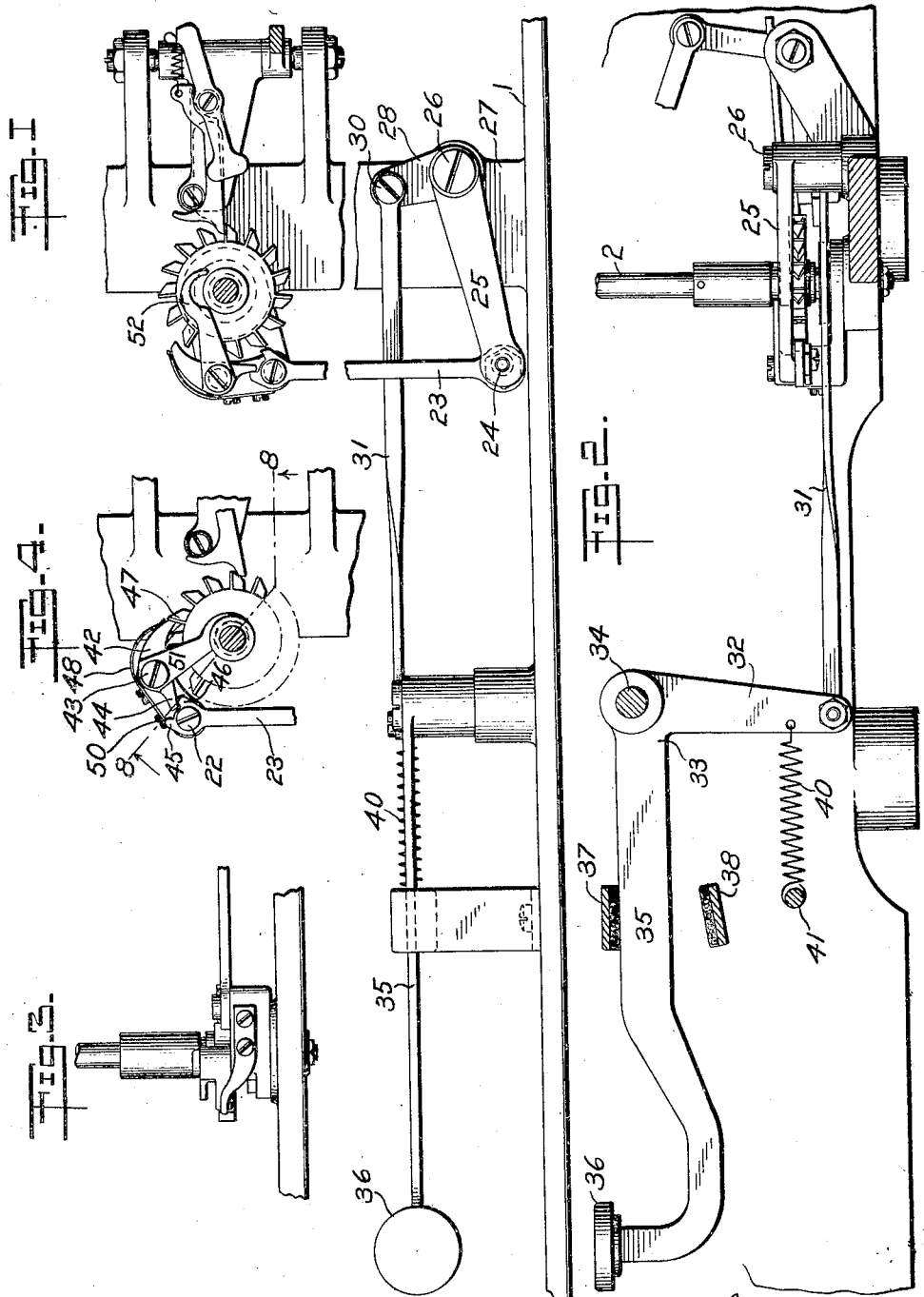

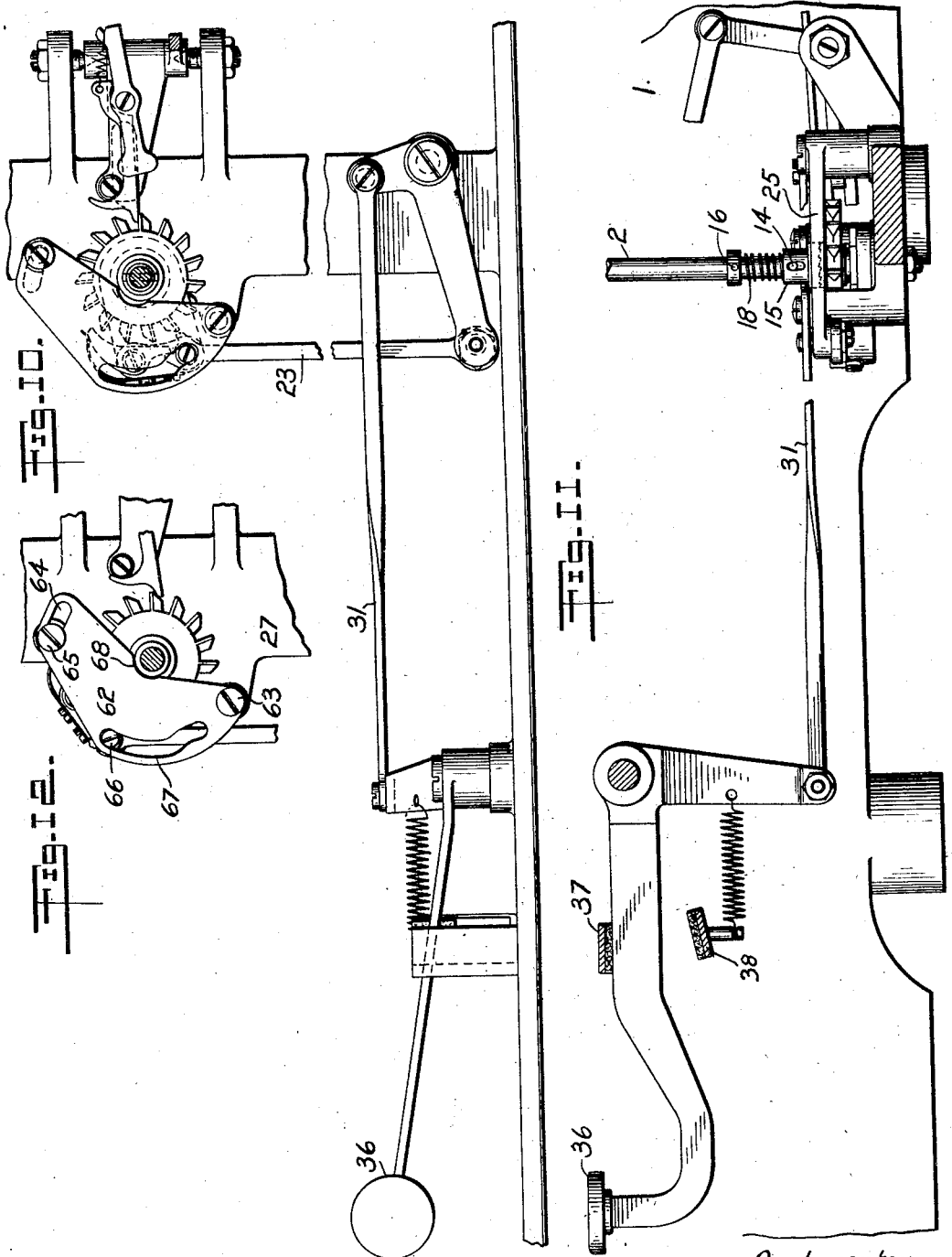

UNITED STATES PATENT OFFICE.

EDWARD H. LORENZ, OF HARTFORD, CONNECTICUT, ASSIGNOR, BY MESNE ASSIGNMENTS, TO THE NOISELESS TYPEWRITER COMPANY, OF MIDDLETOWN, CONNECTICUT, A CORPORATION OF CONNECTICUT.

TYPE-WRITING MACHINE.

1,082,535.  Specification of Letters Patent.  Patented Dec. 30, 1913.

Application filed June 5, 1908. Serial No. 436,750.

*To all whom it may concern:*

Be it known that I, EDWARD H. LORENZ, a citizen of the United States, residing at Hartford, in the county of Hartford and State of Connecticut, have invented certain new and useful Improvements in Typewriting Machines, of which the following is a full, clear, and exact description, such as will enable others skilled in the art to which it appertains to make and use the same.

This invention relates to typewriting machines, and one of the objects thereof is to provide new and improved means for back-stepping the carriage.

Another object thereof is to provide in conjunction with back-stepping mechanism, means for preventing an overthrow of the carriage.

Another object is to provide means whereby the back-stepping pawl will be positively operated and the extent of its throw accurately determined.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is illustrated several of various possible embodiments of my invention, Figure 1 is a plan view thereof; Fig. 2 is a side view of the back spacing mechanism showing the positively-operated pawl and a preferred form of the means for preventing an overthrow of the carriage; Fig. 3 is a side elevation of the mechanism shown in the upper portion of Fig. 1, looking from left to right; Fig. 4 is a plan view of a portion of the mechanism shown in Fig. 1, the parts being shown in another position; Figs. 5, 6 and 7 are views in plan upon an enlarged scale of a portion of the mechanism shown in Fig. 1, showing different positions assumed by the back-stepping pawl when the same is actuated; Fig. 8 is a sectional elevation upon an enlarged scale taken on line 8—8, Fig. 4, looking in the direction of the arrow; Fig. 9 is a view in elevation of the escapement shaft, showing a modification of a clutch device employed herein; Fig. 10 is a plan view of a modified form of mechanism for preventing an overthrow of the carriage; Fig. 11 is a side elevation of the mechanism shown in Fig. 10; and Fig. 12 is a plan view of the upper portion of Fig. 10, but showing the parts in a different position.

Similar reference characters refer to similar parts throughout the several parts of the drawings.

Referring now to the drawings, and particularly to the embodiment of my invention illustrated in Figs. 1 to 8, inclusive, 1 denotes a portion of the framework of the machine, and 2 the escapement shaft which is supported at its lower end in a bearing 3 threaded into a bracket 4 formed in the framework of the machine, said escapement shaft at its upper end being journaled upon a trunnion screw 5 similarly threaded into a portion of the framework of the machine. The feed-pinion 6, in the present instance, is fixed upon the escapement shaft 2 and meshes with the feed rack of the platen carriage, a portion of which is shown at 7, the remaining portions of the platen carriage not being shown herein. The escapement wheel 8, in the present instance, is loosely mounted upon the escapement shaft and has upon its hub portion 10 a plurality of teeth 11, with which engage teeth 12 formed upon a member 13 slidably mounted upon the escapement shaft 2 and held against rotation thereon by means of a loose key 14 extended through an aperture in the escapement shaft. This key is held in position by means of a collar 15, which is fixed upon the shaft by means of a pin 16, said collar terminating adjacent a shoulder 17 provided upon the slidable member 13. It will be seen that a space is provided between the end of collar 15 and the shoulder 17 of the slidable member, the purpose of which will be apparent hereinafter. The hub portion 10 of the escapement wheel 8 and the slidable member 13 constitute a clutch, the teeth thereof being held in engagement by means of an extensile spring 18 fastened upon the escapement shaft and interposed between the shoulder 20 formed upon collar 15, and the slidable clutch member 13. By means of this construction, the escapement wheel is compelled to rotate with the escapement shaft when the carriage is afforded a feed in its letter-spacing direction, but is allowed to remain stationary during the returning of the carriage to a line-commencing position. The escapement wheel is fed by means of fixed and movable dogs 19 and 20, respectively, mounted upon a rocker member 22 adapted to be actuated through a connection with the universal bar (not shown.)

Positioned exteriorly of bearing 3 of the escapement shaft is an oscillating arm or bracket 21, to which is attached, as at 22, a link 23, said link being in turn connected to an eccentric stud 24 mounted upon one leg of a bell-crank lever 25 pivoted at 26 upon a suitable bracket 27. The other leg 28 of this bell-crank lever is pivotally connected at 30 to a link 31, which in turn is pivotally connected to a leg 32 of a bell-crank lever 33. This bell-crank lever, which is pivoted upon a fixed pin 34, has its other leg 35 extended forwardly to the key board and provided with a finger key 36, by means of which it may be operated. Stops, as at 37 and 38, are provided for limiting the oscillatory movements of this lever and a retractile spring 40 is interposed between leg 32 thereof and a fixed pin 41.

Arm or bracket 21 carries a back-stepping dog 42, which is pivoted thereto at 43, said dog having a rearwardly extending portion or tail piece 44 which is received between the tines 45 and 46 of the forked end of link 23. The other end of dog 42 is adapted to be swung into engagement with the teeth 47 of the escapement wheel 8 and is normally urged to movement in the direction of said teeth by means of a leaf spring 48 secured, as by means of screws 50, to the bracket 21, the free end of the spring engaging the dog. Dog 42 is held in a position removed from the teeth of the escapement wheel by means of the tine 45 of the forked portion of the link 23, but when the finger lever 35 is actuated, said dog, through the mechanism connecting arm 21 therewith, will be swung into engagement with a tooth of the escapement wheel as shown in Fig. 6 of the drawings, and during the further downward movement of the finger key 35 said arm will be oscillated partly around escapement shaft 2, whereupon dog 42 is moved to the position shown in Fig. 7 and effects a backward rotation of the escapement wheel and a corresponding backward movement of the platen carriage through the connection of the escapement wheel 8 therewith. At the end of the stroke of the back-stepping dog 42, the tine 46 of the forked portion of link 23 engages the tail piece 44 of the dog 42 and locks the same into the teeth of the escapement wheel, preventing further movement of the actuating parts, and, of course, a further rotative movement of the escapement wheel. On the return stroke, the tine 45 engages the tail piece 44 of the dog 42 and forces the actuating end thereof out of engagement with the teeth of the escapement wheel, as clearly shown in Fig. 5 of the drawings.

Referring now to that part of the mechanism for preventing an overthrow of the carriage when the same is back-spaced and particularly to the preferred embodiment thereof shown in Figs. 1, 3, 4 and 8, 51 indicates a finger attached, as at 43, to the positively operated pawl 42, said finger having a forked outer end 52 which is disposed adjacent the clutch constituted by the toothed hub portion 10 of the escapement wheel and the slidable clutch member 13 when the dog 42 is in a position removed from the escapement wheel. When, however, the dog 42 is swung into engagement with the teeth of the escapement wheel 8, the forked end 52 of finger 51 is projected between the shoulder 17 of the movable clutch member 13 and the depending end of the fixed collar, 15, thereby preventing the clutch member 13 from rising and becoming disengaged from the teeth formed upon the escapement wheel, so that any overthrow of the carriage is prevented, no matter how rapidly or with what force the back-spacing key is struck. It will, therefore, be impossible to back-space the carriage to a greater extent than one tooth upon a single depression of the back-spacing key.

In Fig. 9 of the drawings, a different embodiment of the clutch mechanism is shown. In this embodiment the escapement wheel 8 is fixed permanently to the escapement shaft 2 and the feed-pinion 6 is free thereon. The feed-pinion 6 has its hub portion 53 provided with teeth 54, which engage teeth 55 formed upon the end of a vertically shiftable collar 56 which extends downwardly to provide a space between the escapement wheel and the end of said collar of sufficient width to permit the entry of the forked portion 52 of the finger 51. The collar 56 is keyed to the escapement shaft and a spring 57, interposed between a collar 58 fixed upon the escapement shaft 2 interiorly of the vertically shiftable collar 56 and a shoulder 60 formed in the latter, urges the teeth thereof into engagement with the teeth 54 of the hub portion 53 of the feed-pinion. Whenever the back-stepping dog 42 is projected into the teeth of the escapement wheel, to rotate the latter in a reverse direction, the forked end of finger 51 is projected between the lower end of collar 56 and the upper end of a shoulder 61 upon the escapement wheel and prevents the former from being thrown downwardly to thereby disengage the feed-pinion from the escapement shaft and likewise prevents any overthrow of the carriage during the back-spacing operation.

In Figs. 10 to 12, inclusive, I have provided a different form of means for preventing an overthrow of the carriage during the back-stepping, the back-stepping mechanism in this embodiment being similar to those hereinbefore described. In this construction, the finger 51 is omitted and there is substituted therefor the shiftable cam plate 62 pivoted at 63 in the fixed bracket 27 supported upon the frame of the machine. This cam plate is provided with a slot 64 at its other end, which engages with a screw 65, secured to the fixed bracket 27. The oscillating bracket 21, which is journaled exteriorly of the bearing 3 of the escapement shaft, is provided with a stud 66 which engages within a cam slot 67 formed in the plate 62; and said plate is also provided with a curved portion 68 adapted to engage with the shoulder 17 of the slidable clutch member 13 and take under the end of the fixed collar 15 of the escapement shaft 2. When the connecting link 23 is actuated from the key board to swing the back-stepping pawl 42 into the path of the escapement wheel, the stud 66 of the oscillating arm 21 moves the cam plate 62 from the position shown in Fig. 10 of the drawings to that shown in Fig. 12 of the drawings, causing the curved portion 68 thereof to engage the clutch members in the manner above described, thus preventing the clutch members from being disengaged during the back-stepping operation and accordingly preventing an overthrow of the carriage.

Having thus described the construction of the several embodiments of my invention, the operation thereof, which should be largely obvious from the above description is substantially as follows: It will be understood that during the operation of the machine, the escapement devices coöperating with the escapement wheel will afford a feed of the carriage in the usual manner. When the carriage is returned by the hand of the operator to a new line-commencing position, the spring-controlled clutch will be automatically disengaged, whereby the escapement shaft may be rotated freely in the reverse direction without compelling a rotation of the escapement wheel, which will be allowed to remain stationary, while the clutch interposed between said escapement shaft and said feed-pinion will be automatically disengaged to allow a free rotation of the feed-pinion during the return of the carriage to initial position. When it is desired to back-space the carriage, a depression of the finger lever 35 at the key board will, through the mechanism connected therewith, project the back-stepping dog 42 into the teeth of the escapement wheel, whereupon the same will be rotated in a reverse direction, the extent of the throw of the pawl being determined by means of the tine 46 of the forked portion of link 23. Simultaneously with the throw of the dog 42 into engagement with the teeth of the escapement wheel, the forked portion of the member 51 of the first-described embodiment will be interposed between the slidable clutch member 13 and the fixed collar 15 of the escapement shaft to prevent said collar from being disengaged during the back-spacing operation, and the portion 68 of the cam plate 62 will likewise be thrown into position to prevent a disengagement of the member of the clutch in the last-described embodiment.

It will accordingly be seen that I have provided mechanism well adapted to attain among others, all the ends and objects above pointed out, in a simple yet efficient manner. The back-stepping dog, while normally disengaged and positively held out of the path of the teeth of the escapement wheel, is readily thrown into engagement therewith, and the throw thereof is, moreover, accurately determined. The means for holding the clutch members in engagement during the back-stepping operation effectively eliminates any chance of the carriage being back-spaced to a greater extent than one tooth at a single depression of the finger key.

As many changes could be made in the above construction and several different embodiments of this invention could be made without departing from the scope thereof, it is intended that all matter contained in the above description or shown in the accompanying drawings shall be interpreted as illustrative and not in a limiting sense.

Having described my invention what I claim as new and desire to secure by Letters Patent is:

1. In a typewriting machine, the combination with the platen carriage provided with a feed rack and the escapement devices comprising a fixed and a movable dog, of an escapement shaft, of an escapement wheel loosely mounted upon said escapement shaft with which said feed dogs coöperate, a clutch interposed between said shaft and said escapement wheel, whereby said shaft is free to rotate in one direction with respect to said escapement wheel, but compels a rotation of said escapement wheel therewith when said shaft is rotated in another direction, a feed pinion mounted upon said shaft and meshing with said feed rack, means coöperating with said escapement wheel to directly engage and turn the same to backstep the carriage, and means for preventing a backward movement of the carriage of more than one space.

2. In a typewriting machine, the combination with the platen carriage provided with a feed rack and the escapement devices comprising a fixed and a movable dog, of an escapement shaft, an escapement wheel loosely mounted upon said escapement shaft with which said feed dogs coöperate, a clutch interposed between said shaft and said escapement wheel, whereby said shaft is free to rotate in one direction with respect to said escapement wheel, but compels a rotation of said escapement wheel therewith when said shaft is rotated in another direction, a feed pinion mounted upon said shaft and meshing with said feed rack, a manually operated dog coöperating with said escapement wheel to rotate the same in a reverse direction, thereby backspacing the carriage, and means for preventing an overthrow of the carriage when the same is backspaced.

3. In a typewriting machine, the combination with the platen carriage provided with a feed rack and the escapement devices comprising a fixed and a movable dog, of an escapement shaft, an escapement wheel loosely mounted upon said escapement shaft with which said feed dogs coöperate, a clutch interposed between said shaft and said escapement wheel, whereby said shaft is free to rotate in one direction with respect to said escapement wheel, but compels a rotation of said escapement wheel therewith when said shaft is rotated in another direction, a feed pinion mounted upon said shaft and meshing with said feed rack, a dog pivoted concentrically with the axis of said escapement wheel and adapted to be engaged therewith to compel a backward rotation of said escapement wheel to thereby backspace the carriage, and means coöperating with said clutch for preventing an overthrow of the carriage when the same is backstepped.

4. In a typewriting machine, the combination with the platen carriage provided with a feed rack and the escapement devices comprising a fixed and a movable dog, of an escapement shaft, an escapement wheel loosely mounted upon said escapement shaft with which said feed dogs coöperate, a clutch interposed between said shaft and said escapement wheel, whereby said shaft is free to rotate in one direction with respect to said escapement wheel, but compels a rotation of said escapement wheel therewith when said shaft is rotated in another direction, a feed pinion mounted upon said shaft and meshing with said feed rack, a bracket journaled concentrically of said escapement shaft, a backstepping dog mounted upon said bracket and adapted to be thrown into engagement with said escapement wheel to compel a backward rotation thereof, whereby the carriage may be backstepped, and means coöperating with said clutch for preventing the carriage from being backstepped more than one space.

5. In a typewriting machine, the combination with the platen carriage provided with a feed rack, of an escapement shaft, an escapement wheel loosely mounted upon said escapement shaft, a clutch interposed between said shaft and said escapement wheel, a feed pinion mounted upon said escapement shaft and meshing with said feed rack, said clutch permitting a reverse rotation of said escapement shaft with respect to said escapement wheel when the carriage is returned to a line commencing position, escapement devices coöperating with said escapement wheel to afford a feed of the carriage, a backstepping dog adapted to be oscillated circumferentially about the axis of said escapement shaft and to be swung into engagement with said escapement wheel to rotate the same in a reverse direction whereby the carriage will be backspaced, and means coöperating with said clutch for preventing an overthrow of the carriage when the same is backspaced.

6. In a typewriting machine, the combination with the platen carriage, provided with a feed rack and the escapement devices comprising a fixed and a movable dog, of an escapement shaft, a feed pinion mounted upon said escapement shaft and meshing with said feed rack, an escapement wheel loosely mounted upon said escapement shaft with which said feed dogs coöperate to afford a feed of the carriage, a clutch interposed between said escapement shaft and said escapement wheel whereby said escapement wheel and said shaft are compelled to move in unison when rotated in one direction, but which permits a rotation of said escapement shaft in a reverse direction when the carriage is returned to begin a new line of writing, a radially movable dog adapted to be swung into engagement with said escapement wheel to rotate the same in the reverse direction, thereby backspacing the carriage, and means for holding the operative parts of said clutch in engagement during the backspacing operation whereby an overthrow of the carriage is prevented.

7. In a typewriting machine, the combination with the platen carriage provided with a feed rack, and the escapement devices comprising a fixed and a movable dog, of an escapement shaft, a feed pinion mounted on said shaft and meshing with said feed rack, an escapement wheel loosely mounted upon said shaft, with which said feed dogs coöperate to afford a feed of the carriage, said movable dog being yieldable to escape the teeth of said escapment wheel when the same is rotated in the reverse direction, a bracket journaled concentrically of said escapement shaft, a dog swiveled upon said bracket, means for oscillating said bracket and for swinging said dog into engagement with said escapement wheel to compel a backward rotation of the escapement wheel, whereby the carriage will be backspaced, and automatically operated means for preventing a relative movement between the members of said clutch during the backspacing operation whereby an overthrow of the carriage will be prevented.

8. In a typewriting machine, the combination with the platen carriage provided with a feed rack and the escapement devices comprising fixed and movable dogs, of means for connecting the escapement devices with the feed rack, comprising an escapement shaft, an escapement wheel loosely mounted upon said escapement shaft, a clutch interposed between said escapement shaft and said escapement wheel, comprising a pair of toothed members, one of which is formed upon the escapement wheel and the other of which is mounted to slide upon said shaft, a spring for holding said clutch members in operative relation, whereby a back spacing of the escapement wheel compels a rotation of the escapement shaft, a backstepping dog, movably supported adjacent said escapement wheel, means for swinging said dog into engagement with said escapement wheel to rotate the latter in a reverse direction whereby the carriage will be backstepped, and means mounted upon the support for said dog adapted to engage the movable member of said clutch whereby said clutch members are held in operative position during the backstepping operation, thereby preventing an overthrow of the carriage.

9. In a typewriting machine, the combination with a platen carriage, provided with a feed rack and the escapement devices comprising fixed and movable dogs, of means for connecting the escapement devices with the feed rack, comprising an escapement shaft, a feed pinion mounted upon said escapement shaft and meshing with said feed rack, an escapement wheel loosely mounted upon said escapement shaft, a clutch interposed between said escapement shaft and said escapement wheel, comprising a pair of toothed members, one of which is formed upon the escapement wheel and the other of which is mounted to slide upon said shaft and is keyed thereto, a spring for holding the members of said clutch in operative relation, whereby the back spacing of the escapement wheel compels a rotation of the escapement shaft, a movable support mounted on said escapement shaft, a backstepping dog swiveled upon said support, said dog being normally held out of contact with said escapement wheel, means for oscillating said support operable from the key-board, means for simultaneously swinging said backstepping dog into engagement with said escapement wheel to rotate the latter in a reverse direction whereby the carriage will be back-spaced, and means for automatically maintaining the members of said clutch in engagement during the backspacing operation whereby the carriage will be prevented from being overthrown during such backspacing operation.

10. In a typewriting machine the combination with the feed rack of the platen carriage and the escapement devices comprising fixed and movable dogs of an escapement shaft, a feed pinion mounted upon said shaft and meshing with said feed rack, an escapement wheel mounted upon said escapement shaft with which said feed dogs coöperate, clutch mechanism interposed between said feed pinion and said escapement wheel whereby those parts are compelled to move in unison when rotated in one direction, but may move relatively to each other when one thereof is rotated in a reverse direction, means coöperating with said escapement wheel to rotate the same in a reverse direction to backspace the carriage, and means for automatically holding the members of said clutch in engagement during the backspacing operation.

11. In a typewriting machine, the combination with the feed rack of the platen carriage and the escapement devices comprising a fixed and a movable feed dog, of means for effecting a connection between said escapement devices and said feed rack comprising an escapement shaft, a feed pinion mounted on said shaft and meshing with said feed rack, an escapement wheel mounted on said escapement shaft with which said feed dogs coöperate to afford a feed of the carriage, a clutch comprising a pair of relatively movable members, one of which is spring-pressed toward the other, said clutch being interposed between said feed pinion and said escapement wheel, whereby said elements are compelled to rotate in unison in one direction, but may move independently of one another when one thereof is rotated in the reverse direction, a backstepping dog arranged adjacent said escapement wheel and normally out of contact therewith, a movable support for said dog, and a forked member pivotally connected with said support and operable from a position at the key-board adapted when actuated to permit said dog to be engaged with said escapement wheel, whereby during a further movement thereof, said dog will rotate said escapement wheel in the reverse direction, said forked member coöperating with said dog to determine the throw of the latter.

12. In a typewriting machine, the combination with the feed rack of the platen carriage, and the escapement devices comprising fixed and movable feed dogs, of means for effecting a connection between the escapement devices and said feed rack comprising an escapement shaft, a feed pinion mounted upon said shaft and meshing with said feed rack, the escapement wheel loosely mounted upon said escapement shaft, a clutch interposed between said escapement shaft and said escapement wheel comprising a pair of toothed members, one of which is formed upon said escapement wheel and the other of which is mounted to slide upon said shaft and is keyed thereto against rotation, a spring for holding said clutch members in operative relation, whereby a back spacing of the escapement wheel compels a rotation of the escapement shaft, a backstepping dog adapted to be swung into engagement with said escapement wheel to rotate the latter in a reverse direction, and means for engaging said movable clutch member to hold the same in engagement with its coöperating clutch member during the reverse rotation of the escapement wheel whereby an overthrow of the carriage will be prevented.

13. In a typewriting machine, the combination with the feed rack of the platen carriage and the escapement devices comprising fixed and movable feed dogs, of means for connecting said escapement devices with the feed rack comprising an escapement shaft, a feed pinion mounted upon said escapement shaft and meshing with said feed rack, an escapement wheel loosely mounted upon said escapement shaft with which said feed dogs coöperate to afford a feed of the carriage, a toothed member formed upon said escapement wheel, a toothed member slidably mounted upon said escapement shaft and keyed thereto, whereby said member is freely slidable upon said shaft, but is held against rotation relative thereto, a spring for urging said movable toothed member into engagement with the teeth of the member formed upon said escapement wheel, a backstepping dog mounted upon a movable support adjacent said escapement wheel, means for swinging said dog into engagement with said escapement wheel to rotate the same in the reverse direction, whereby the carriage will be backstepped, and means mounted upon said support adapted to take behind said movable toothed member to hold the same in engagement with the toothed member upon said escapement wheel during the engagement of said dog with said escapement wheel whereby said toothed members will be held in engagement during the backspacing operation and the carriage thereby prevented from being overthrown.

14. In a typewriting machine, the combination with an escapement shaft having a feed pinion thereon and a feed rack on the platen carriage with which said pinion meshes, of an escapement wheel, means for affording a feed of the same in a letter-spacing direction, means for backspacing the carriage step by step, a clutch between said escapement wheel and said pinion, and means coöperating with said clutch for preventing an overthrow of the carriage when the same is backstepped.

15. In a typewriting machine, the combination with the feed rack of the platen carriage, of an escapement shaft having a pinion meshing with said rack and an escapement wheel, a clutch between said escapement wheel and said pinion, and means coöperating with said clutch for preventing an overthrow of the carriage when the same is backstepped.

16. In a typewriting machine, the combination with the feed rack of the platen carriage and the escapement devices comprising fixed and movable feed dogs, of means for effecting a connection between said escapement devices and said feed rack comprising an escapement shaft, a feed pinion fixed upon said escapement shaft and meshing with said feed rack, an escapement wheel loosely mounted upon said escapement shaft with which said feed dogs coöperate to afford a feed of the carriage in a letter-spacing direction, a clutch comprising a toothed member formed upon said escapement wheel and a member slidably mounted upon said escapement shaft having teeth which engage the teeth of said escapement wheel, means for keying said slidable member to said escapement shaft, a spring for urging said slidable member into engagement with the teeth formed upon said escapement wheel whereby said escapement wheel will compel a movement of said escapement shaft when rotated in the reverse direction, but may remain stationary when the carriage is returned to commence a new line of writing, a movable support journaled concentrically with the axis of said escapement shaft, a backstepping dog swiveled upon said support and normally held out of engagement with said escapement wheel, a forked member pivotally connected with said support, one of the tines of which operates to hold said dog out of engagement with said escapement wheel, means operable from the keyboard for reciprocating said forked member to move said support, spring means adapted simultaneously with a movement of said support to swing said dog into engagement with the teeth of said escapement wheel, whereby the latter will be rotated in a reverse direction and the carriage moved backwardly thereby, the other tine of said forked member operating to limit the throw of said dog, and a member mounted upon said support which takes behind said movable clutch member and holds the teeth thereof in engagement with the teeth formed upon said escapement wheel while the latter is being rotated in a reverse direction, thereby preventing an overthrow of the carriage during the backspacing operation.

17. In a typewriting machine, the combination with the feed rack of the platen carriage, an escapement shaft, a pinion at one end of said shaft meshing with said rack and an escapement wheel at the opposite end, a clutch member intermediate said pinion and said escapement wheel, means coöperating with said escapement wheel for backspacing the carriage, and means actuated by said backspacing means adapted to hold the members of the clutch in operative relation to prevent an overthrow of the carriage.

18. In a typewriting machine, the combination with the feed rack of the platen carriage, an escapement shaft having a pinion meshing with said rack and an escapement wheel mounted thereon, a clutch for operatively connecting said pinion and said escapement wheel, and means for locking the members of said clutch in positive engagement when the carriage is backspaced.

19. In a typewriting machine, the combination with the feed rack of the platen carriage, an escapement shaft having a pinion at one end thereof to mesh with said carriage rack and an escapement wheel at the opposite end, means for backspacing the carriage through said escapement shaft, a clutch between said escapement wheel and said pinion, and means for holding the clutch members in operative engagement when said backspacing means is actuated.

20. In a typewriting machine, the combination with the platen carriage, of an escapement shaft, means for operatively connecting said parts, an escapement wheel on said shaft, feed means coöperating therewith, back spacing means adapted to engage and turn said escapement wheel to feed the carriage in a reverse direction, a clutch associated with said parts whereby motion may be transmitted from the escapement wheel to the carriage to backspace the same but prevent motion from being transmitted from the carriage to the escapement wheel when the carriage is returned to the line-commencing position and means for holding the parts of said clutch in clutched relation when the back spacing means is actuated.

In testimony whereof I affix my signature in the presence of two witnesses.

EDWARD H. LORENZ.

Witnesses:
C. H. WILCOX,
H. M. SEAMANS.

---

Copies of this patent may be obtained for five cents each, by addressing the "Commissioner of Patents, Washington, D. C."